(No Model.)

W. ENGELBRECHT.
FLY TRAP.

No. 601,953. Patented Apr. 5, 1898.

WITNESSES:
J. A. Brophy
Isaac Brent

INVENTOR
W. Engelbrecht.
BY
ATTORNEYS.

THE NORRIS PETERS CO., PHOTO-LITHO., WASHINGTON, D. C.

United States Patent Office.

WILLIAM ENGELBRECHT, OF ASH GROVE, ILLINOIS.

FLY-TRAP.

SPECIFICATION forming part of Letters Patent No. 601,953, dated April 5, 1898.

Application filed December 7, 1897. Serial No. 661,046. (No model.)

*To all whom it may concern:*

Be it known that I, WILLIAM ENGELBRECHT, of Ash Grove, in the county of Iroquois and State of Illinois, have invented a new and Improved Fly-Trap, of which the following is a full, clear, and exact description.

This invention is a fly-trap having a cage in which the flies are imprisoned and having an inlet-funnel above a bait-receptacle, so that the flies entering from the bait-receptacle through the funnel to the cage are caught, the apparatus embodying certain novel features of construction and combinations which make it more effective than others heretofore produced.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1:
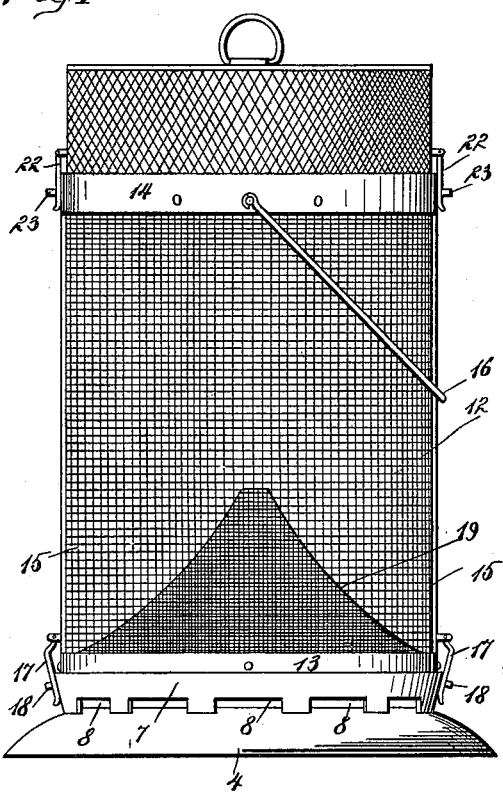
Figure 2:
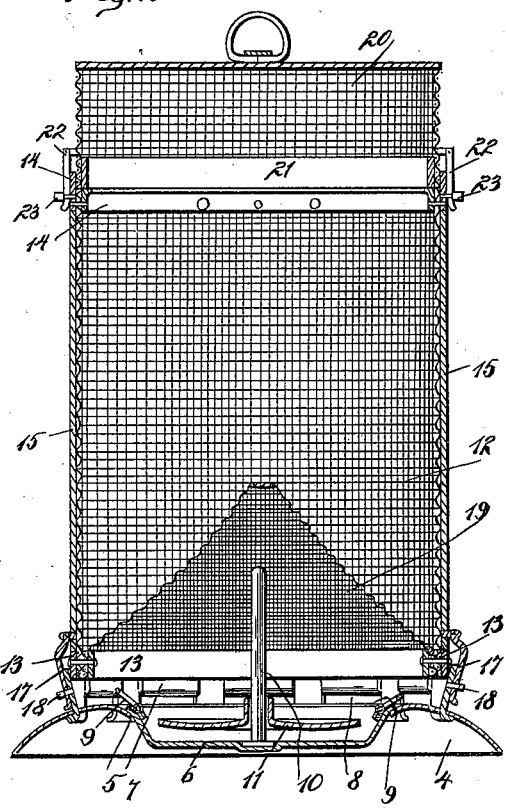
Figure 3:
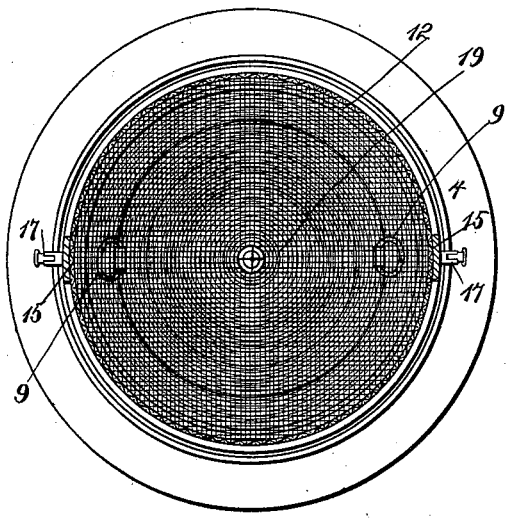

Figure 1 is a side elevation of the invention. Fig. 2 is a vertical section thereof, and Fig. 3 is a horizontal section thereof.

The trap has an annular base 4, with a central orifice 5, in which is removably seated a pan 6 for the reception of a bait, such as thinned molasses or other sweet substances. Secured firmly on the base 4 is an annulus 7, having a series of orifices 8 for the admission of the flies. The pan 6 has bails 9 at its side edges by which the pan may be handled.

Standing centrally in the pan 6 is a post 10, on which a float is vertically movable, said float being adapted to rest in the pan on the surface of the bait. This bait is always of a liquid nature, and the float 11, bearing thereon, serves as a resting-place for the flies and prevents them from falling into the bait and being drowned.

The cage 12 is constructed of wire-gauze having clamping-rings 13 at its base and similar rings 14 at its top, these clamping-rings being connected by longitudinally-extending metallic plates 15. A bail 16 is connected with the ring 14, so as to permit handling the trap. The cage 12 is adapted to be seated within the annulus 7, which is slightly tapered to permit such arrangement, and the cage is held by hasps 17, engaging buttons 18 on the annulus 7. The rings 13, in addition to clamping the material of the cage 12, clamp a wire-gauze funnel 19, which is thereby held rigidly within the cage and which tapers upward and has at its apex four openings of a size sufficient to permit the flies to creep through them, but insufficient to allow the return of the flies. The cage has a top 20, which has a rigid ring 21 at its lower edge, such ring bearing on the inner ring 14 and which is held securely in place by hasps 22, respectively engaging buttons 23 on the outer ring 14.

The top of the trap is adapted to receive the dead flies.

In operation the flies enter the orifices 8 in great numbers, and after feeding upon the bait in the pan 6 proceed directly through the funnel 19 to the interior of the cage 12, from which they may be taken at will. The trap is very effective and is particularly adapted for catching flies in large numbers and with little trouble, as the trap has to be emptied and reset only once a day.

Having thus described my invention, I claim as new and desire to secure by Letters Patent—

1. A fly-trap, having a base with a central orifice therein, a pan seated in said orifice and adapted to contain the bait, a post standing centrally on the pan, a float movable vertically on the post and adapted to be sustained by the liquid bait within the pan, an annulus bearing on the base and surrounding the pan and having orifices for the admission of the flies, a cage seated on the annulus, and a funnel within the cage, the funnel overhanging the bait-pan and opening into the cage.

2. A fly-trap having a base with an orifice in the center thereof, a bait-pan seated in the orifice, a post standing on the bait-pan, a float having vertical movement on the post, an annulus seated on the base, and a cage bearing on the annulus and located over the bait-pan.

3. A fly-trap having a receptacle for liquid bait, a post standing in said receptacle, and a float movable vertically on the post and capable of being sustained on the bait in said receptacle.

4. A fly-trap, having a base provided with a receptacle for liquid bait, a cage supported on the base, and a float adapted to be sustained on said liquid bait to afford a resting-place for the flies.

WILLIAM ENGELBRECHT.

Witnesses:
 HENRY HASSELBRING,
 WM. KNAKE.